May 23, 1933.    G. MACOMBER    1,911,132
DRILLING MACHINE
Filed June 19, 1930    4 Sheets-Sheet 1

Inventor
GLEN MACOMBER.
By Wesley P. Merrill
Attorney

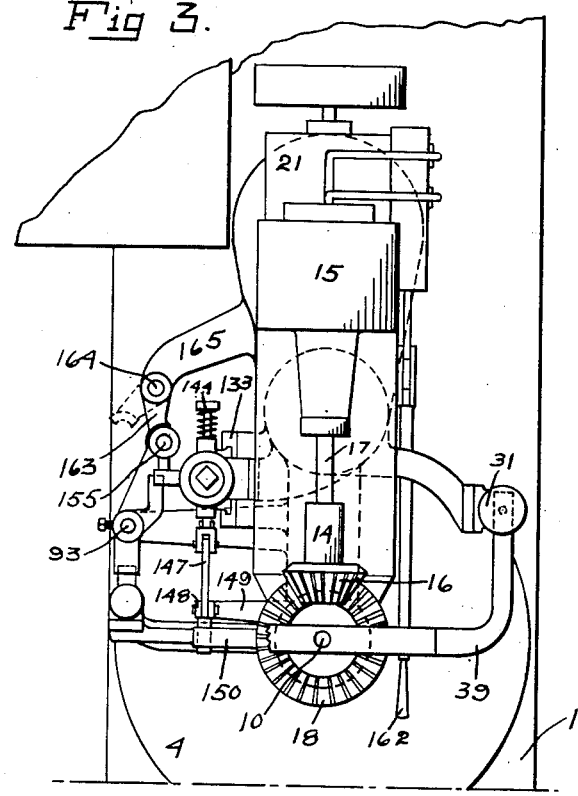

May 23, 1933.  G. MACOMBER  1,911,132
DRILLING MACHINE
Filed June 19, 1930  4 Sheets-Sheet 3

Inventor
GLEN MACOMBER.
By Wesley P. Merrill
Attorney

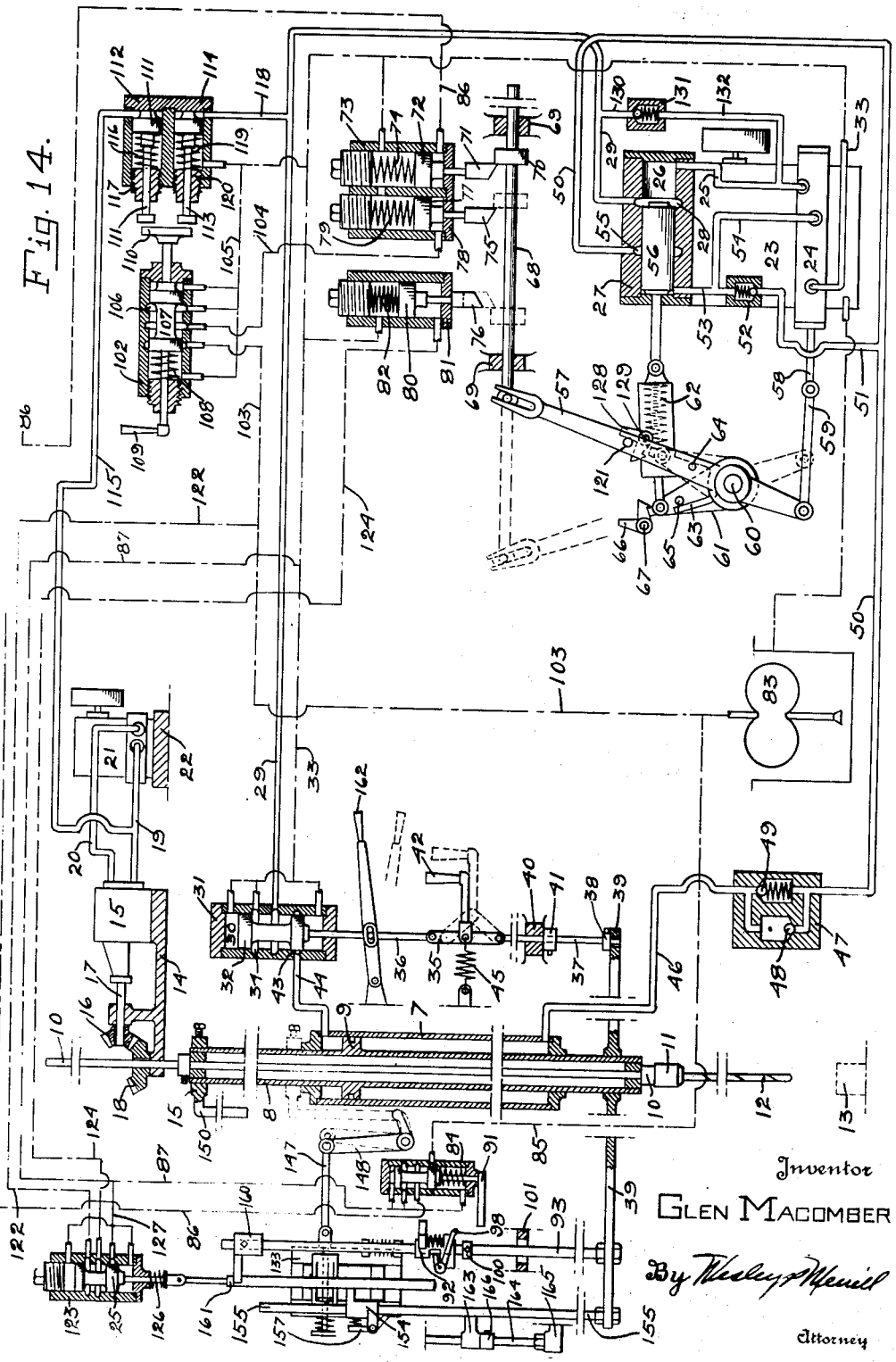

Patented May 23, 1933

1,911,132

UNITED STATES PATENT OFFICE

GLEN MACOMBER, OF WAUKESHA, WISCONSIN, ASSIGNOR TO THE OILGEAR COMPANY, OF MILWAUKEE, WISCONSIN, A CORPORATION OF WISCONSIN

DRILLING MACHINE

Application filed June 19, 1930. Serial No. 462,230.

This invention relates to drilling machines. The machine to which the invention applies in particular is ordinarily employed for drilling deep holes and has a rotary spindle to which a drill or boring tool may be attached, a drive for rotating the spindle, a feed for advancing the tool into the work, and means for retracting the spindle whenever the tool resistance reaches a predetermined maximum, such as the machine disclosed in the copending application of Donald Clute and Lester Sterling, Serial Number 459,154, filed June 4, 1930.

An object of the invention is to provide a machine of this character which is hydraulically controlled, with special reference to preventing breakage of the delicate drills employed in this work.

Another object is to provide a machine which is positive and precise in operation.

According to the invention, the machine is automatically controlled by a hydraulically actuated mechanism which is responsive to predetermined pressures.

A drill press embodying the invention is illustrated in the accompanying drawings in which the views are as follows:

Fig. 3 is a top plan.

Fig. 4 is an elevation of the other side of the machine.

Fig. 5 is a detail of a valve operating mechanism.

Fig. 6 is a vertical section on a line 6—6 of Fig. 5.

Fig. 7 is a sectional plan on a line 7—7 of Fig. 5.

Fig. 14 is a schematic drawing of the hydraulic circuit.

Figure 1:
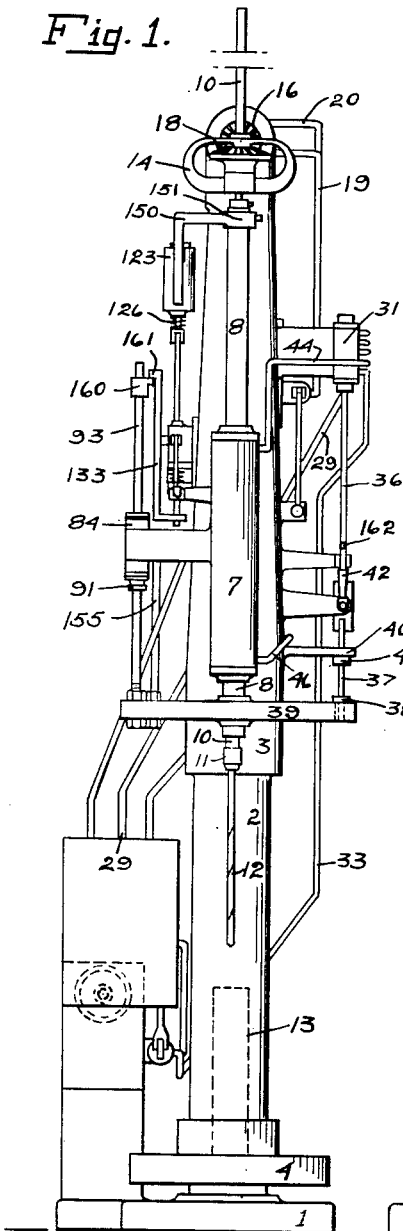
Fig. 1 is a front view of the drill press.
Figure 2:
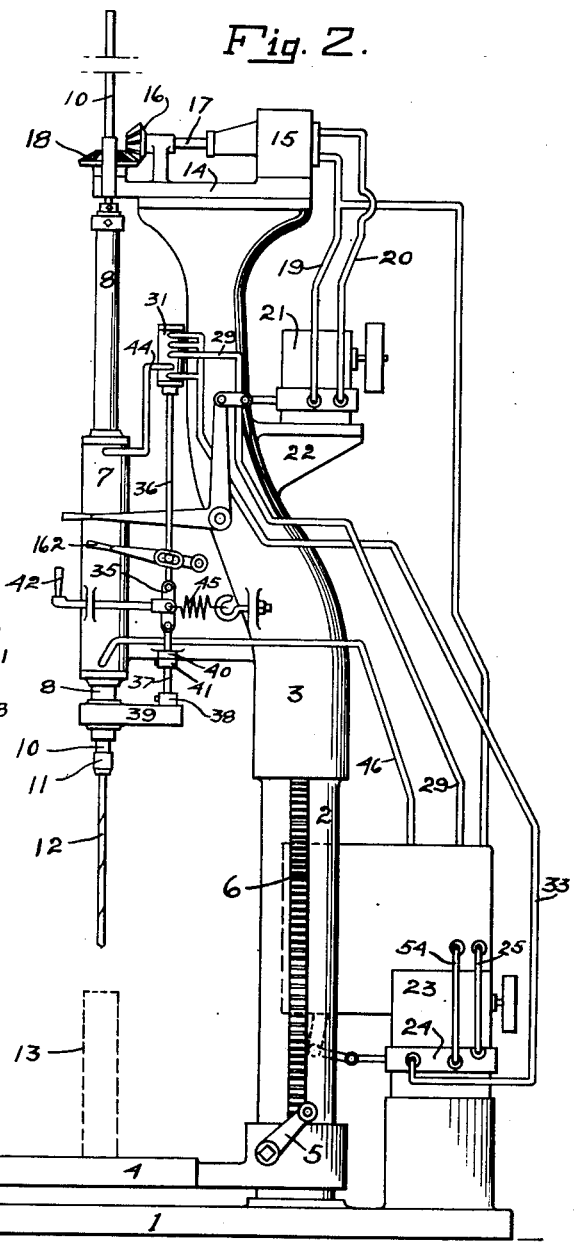
Fig. 2 is an elevation of one side thereof.

The drill press is provided with a base 1 having a vertical column 2 arranged thereon and supporting a frame 3 which carries the mechanism of the drill press. The column 2 has a work table 4 supported thereon and adapted to be raised or lowered by rotating a handle 5 to operate gearing (not shown) which engages a rack 6 carried by the column 2.

The frame 3 carries a feed cylinder 7 in which a tubular ram 8 is arranged and provided intermediate its ends with an annular piston 9 against which hydraulic pressure is exerted to raise and lower the ram.

A spindle 10 is journaled in the ram 8, fixed for axial movement therewith and provided at its lower end with a chuck 11 to receive a drill 12 for operating upon a piece of work 13 carried by the table 4.

The spindle 10 is journaled in a double bearing 14 to rotate and slide therein and is rotated by a conventional constant displacement hydraulic motor 15 which is arranged upon the top of the frame 3 and connected to the spindle 10 by a bevel gear 16 which is fixed upon the motor shaft 17 and meshes with a bevel gear 18 slidably keyed upon the spindle 10.

The motor shaft 17 is also journaled in the double bearing 14 which is carried upon the top of the frame 3 and restrains the gears 16 and 18 from axial movement.

The motor 15 is connected by pipes 19 and 20 to a conventional constant speed, variable delivery pump 21 which is arranged upon a bracket 22 carried by the frame 3. The pump 21 may be regulated to vary the rate of delivery of liquid to the motor 15 and thereby vary the rotary speed of the spindle 10.

The ram 8 and the spindle 10 are advanced and retracted by liquid supplied to the cylinder 7 from a variable delivery pump 23 which is adjustable to vary its delivery from the full capacity of the pump to substantially zero and thus vary the axial velocity of the ram 8.

Liquid is delivered to the cylinder 7 at the full capacity of the pump 23 to provide a rapid traverse for the ram 8 and at a lower rate to feed the drill 12 into the work.

The pump 23 has a control (not shown), which may be adjusted to vary the feeding rate of delivery and thus vary the rate at which the drill 12 is fed into the work, and a valve 24 which is operated automatically to change the direction of flow of liquid between the pump 23 and the cylinder 7 and to cause the pump to deliver liquid at either its full capacity or at the feeding rate.

The pump 23 and its valve 24 form no part of the present invention and have not been described herein as a pump and its valve which may be employed are fully illustrated and described in Patent No. 1,753,562, issued April 8, 1930 to John P. Ferris.

Liquid discharged from the pump 23 normally passes through the valve 24 and a pipe 25 into the cylinder 26 of an automatically operated valve 27 and then through a port 28 and a pipe 29 into the cylinder 30 of a starting valve 31 which contains a valve plunger 32 to control the flow of liquid to and from the cylinder 7.

When the valve plunger 32 is in the position shown in Fig. 14, the liquid is returned to the pump 23 through a return pipe 33 which has its lower end connected to the valve 24 and its upper end in communication with an annular port 34 formed in the inner wall of the cylinder 30. The ends of the cylinder 30 are also open to the return pipe 33 in order to by-pass liquid from one end of the cylinder to the other as the plunger 32 is reciprocated.

The valve plunger 32 is initially held in the position shown by a toggle joint 35 which has its upper arm pivoted to the stem 36 of the valve plunger 32 and its lower arm pivoted to a rod 37 which has a collar 38 secured upon its lower end and initially engaged by a support 39 carried by the ram 8.

The rod 37 passes through an arm 40 carried by the frame 3 and through the support 39 to be guided thereby, and is held against upward movement by a collar 41 which is fixed thereon and abuts the under side of the arm 40 when the valve plunger 32 is in the position shown in Fig. 14.

The toggle joint 35 has a handle 42 attached thereto which may be drawn outward, as shown in dotted lines in Fig. 14, to break the joint 35 and draw the valve stem 36 and the rod 37 toward each other. As the collar 41 prevents upward movement of the rod 37, the valve stem 36 and the valve plunger 32 are drawn downward, the upper part of the valve plunger 32 covers the return port 34 and the lower part of the plunger 32 uncovers an annular port 43 which is connected to the upper end of the feed cylinder 7 by a pipe 44.

The liquid delivered to the valve cylinder 30 by the pipe 29 then passes through the pipe 44 to the upper end of the cylinder 7 and exerts pressure upon the piston 9 to force the ram 8 and the spindle 10 downward.

At this time, the pump 23 is delivering liquid at its full capacity to the upper end of the cylinder 7 so that the ram 8 moves downward at a rapid rate and quickly moves the support 39 out of engagement with the collar 38. The handle 42 is then released and the arms of the joint 35 are drawn into alinement with the valve stem 36 and the rod 37 by a tension spring 45 which has one end connected to the inner end of the handle 42 and its other end connected to the frame 3. This moves the rod 37 downward and separates the collar 41 from the arm 40.

As the ram 8 moves downward, liquid is returned to the pump 23 through a pipe 46 and a free return resistance valve 47 which comprises a check valve 48 and a resistance valve 49 connected in parallel. The check valve 48 permits liquid to pass freely from the pump 23 to the ram cylinder 7 but prevents it from passing in the opposite direction except through the resistance valve 49 which offers sufficient resistance to the passage thereof to prevent the ram 8 from moving downward when the machine is idle.

Liquid flows from the valve 47 through a pipe 50, a pipe 51 which is connected to the pipe 50 intermediate the ends thereof, a check valve 52, a pipe 53, a pipe 54 which is connected to the pipe 53 intermediate the ends thereof, and then through the valve 24 into the pump 23.

The other end of the pipe 50 is connected to the valve cylinder 26 and communicates with an annular port 55 which is formed in the inner wall thereof and closed at this time by the plunger 56 of the valve 27. The other end of the pipe 53 is connected into the front end of the valve cylinder 26 so that liquid expelled from the lower part of the cylinder 7 acts against the forward end of the valve plunger 56 and tends to move the same rearward, but this tendency is overcome by the pressure of the liquid delivered to the rear part of the valve cylinder 26 by the pipe 25.

The ram 8 continues to move downward at the rapid rate until the valve 24 is operated to change the delivery of the pump 23 from its full capacity to the feeding rate. The valve 24 is operated by an operating lever 57 which is connected at its lower end to the valve stem 58 of the valve 24 by a link 59 and pivoted intermediate its ends upon the stationary shaft 60.

The shaft 60 also has a lever 61 journaled thereon which is connected at its upper end to the plunger 56 of the valve 27 through an equalizing spring 62. The levers 57 and 61 are urged toward each other by a torsion spring 63 which is coaxial with the shaft 60 and has its ends in engagement with pins 64 and 65 carried, respectively, by the levers 57 and 61 and arranged at different distances from the shaft 60 so as to pass each other when the levers are actuated.

The upper end of the lever 61 is initially held against movement toward the lever 57 by a catch 66 which engages the upper end thereof and is pivoted upon a stationary pin 67. The lever 57 is held against movement toward the lever 61 by a slidable bar 68 which is connected to the upper end thereof and arranged in guides 69 to slide therein. The bar 68 has a stop 70 fixed thereon and initially in engagement with a latch 71 carried by a plunger 72 which is arranged in a cylinder 73 and urged outward by a helical spring 74.

The spring 63 is adapted to swing the lever 57 to move the valve plunger 58 into its feeding and rapid traverse reverse positions and thereby move the stop 70 into the positions indicated in Fig. 14 by dotted lines in which it is held by latches 75 and 76.

The latch 75 is carried by a plunger 77 which is arranged in a cylinder 78 and urged outward by a spring 79, and the latch 76 is carried by a plunger 80 which is arranged in a cylinder 81 and urged outward by a spring 82.

The latch cylinders are all connected at their upper ends to the return pipe 33 and the latch plungers are adapted to be urged upward by hydraulic pressure to disengage the latches from the stop 70.

The liquid for raising the latch plungers may be supplied from a gear pump 83 which may be incorporated in the pump 23, as disclosed in Patent No. 1,753,562, or be separate therefrom as indicated diagrammatically in Fig. 14.

Figure 9:
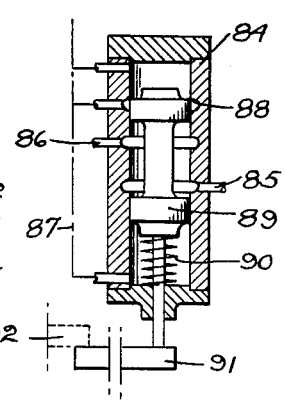
Fig. 9 is a longitudinal section through a valve for reducing the speed of the spindle from rapid traverse forward to the feeding rate.
Figure 10:
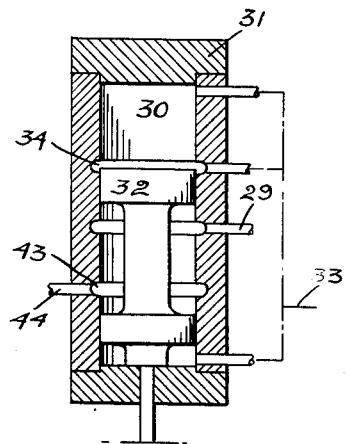
Fig. 10 is a longitudinal section through the starting valve.

The delivery of liquid to the cylinder 73 is controlled by a valve 84 which is connected to the gear pump 83 by a pipe 85 and to the lower part of the cylinder 73 by a pipe 86. The valve 84, which is shown in detail in Fig. 9, is connected at its upper and lower ends to the return pipe 33 by a pipe 87, and provided near its upper end with a return port 88 which is also connected to the return pipe 33 through the pipe 87.

The plunger 89 of the valve 84 is urged toward its upper position by a helical compression spring 90 and is provided at the lower end of its stem with an abutment 91 which is adapted to be engaged by an actuator 92 arranged upon a post 93 carried by the support 39.

Figure 12:
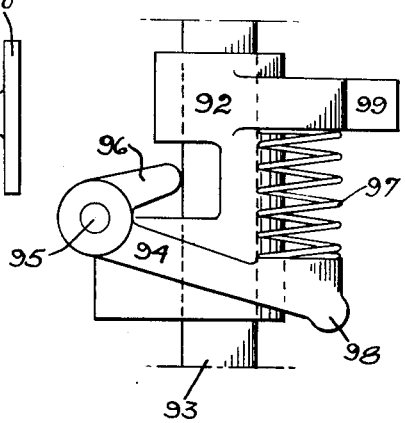
Fig. 12 is a detail of an actuator for operating the valve shown in Fig. 9.
Figure 13:
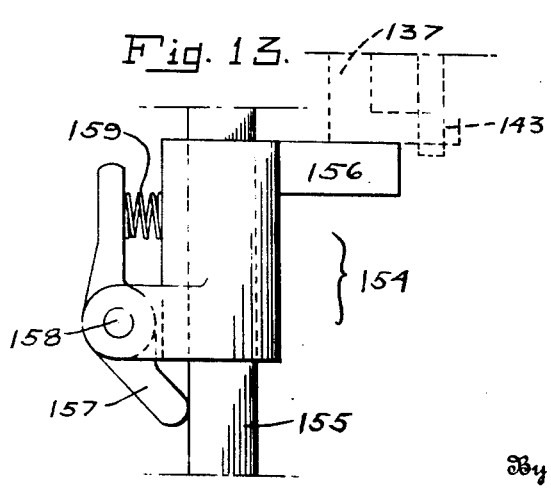
Fig. 13 is a detail of an actuator for operating the valve shown in Fig. 8.

The actuator 92, which is shown in detail in Fig. 12, is adapted to slide upon the post 93 and is provided with a gripping lever 94 for engaging the post 93 to hold the actuator in adjusted positions thereon. The gripping lever 94 is pivoted upon a pin 95 and has its short arm 96 urged against the post 93 by a helical compression spring 97 which is arranged between its long arm 98 and a lug 99 which is preferably formed integral with the body of the actuator to engage the abutment 91.

The actuator 92 is adjusted upon the post 93 to operate the valve 84 just before the drill 12 engages the work 13 and, if other similar pieces of work are to be drilled, the adjusted position of the actuator 92 is definitely located by moving a collar 100 against the bottom of the actuator 92 and securing it in position upon the post 93, as by means of a set screw.

Just before the drill 12 engages the work 13, the lug 99 on the actuator 92 engages the abutment 91 and moves the valve plunger 89 downward against the action of the spring 90 into the position shown in Fig. 9.

Liquid from the pump 83 now flows through the pipe 85, the valve 84 and the pipe 86 to the latch cylinder 73 and raises the plunger 72 and the latch 71 to release the stop 70, thus enabling the spring 63 to swing the lever 57 toward the lever 61 until the stop 70 engages the latch 75 and thereby operates the valve 24 to reduce the delivery of the pump 23 from its full capacity to the predetermined feeding rate.

The liquid delivered by the pump 23 to the cylinder 7 then moves the ram 8 downward at the predetermined feeding rate to feed the drill 12 into the work 13, the actuator 92 abuts a stop 101 carried by the frame 3 and is held against further downward movement thereby, and the collar 100 passes downward through the stop 101.

When the actuator 92 engages the stop 101, the lever 94 is swung upon its pivot 95 against the action of the spring 97 to reduce the pressure of the arm 96 against the post 93 and permit the post to move through the actuator 92 as the ram 8 moves downward.

The ram 8 continues to move downward at the predetermined feeding rate until the resistance to the rotary movement of the spindle 10 increases above a predetermined maximum, as by the drill 12 binding in the work 13, or until the resistance to the downward movement of the spindle 10 increases above a predetermined maximum, as by meeting an obstruction or the drill 12 becoming dull, or until the drill 12 has penetrated the work 13 to the desired depth.

The ram 8 is then retracted by raising the latch 75 to release the stop 70 and enable the spring 63 to swing the operating lever 57 into alinement with the lever 61, as shown in dotted lines in Fig. 14, and thereby operate the valve 24 to direct the delivery of the pump 23 at full capacity into the lower end of the cylinder 7 to retract the ram at high speed.

The latch 75 is raised by liquid supplied from the pump 83 through the valve 102 which is connected to the pump 83 by a pipe 103 and to the latch cylinder 78 by a pipe 104. The valve 102 is connected at each end to to the return pipe 33 by a pipe 105 and is provided intermediate its ends with a port 106 which is also connected to the return pipe 33 by the pipe 105.

The plunger 107 of the valve 102 is urged to its normal position, as shown in Fig. 14, by a helical compression spring 108 and is provided upon each of its ends with a stem which extends through the valve casing. One stem carries a handle 109, by means of which the valve may be operated manually to cause the ram 8 to be retracted, and the other stem carries an abutment 110 which is adapted to be engaged by the plunger 111 of a hydraulic valve actuator 112 or by the plunger 113 of a hydraulic valve actuator 114 to operate the valve 102 automatically.

The valve actuator 112 has its pressure end connected by a pipe 115 to the pipe 19, so that the inner end of the plunger 111 is subjected at all times to the hydraulic pressure which prevails between the driving motor 15 and the pump 20, and its other end is open to the return pipe 33.

The plunger 111 is urged inward against this hydraulic pressure by a helical compression spring 116 whose tension may be adjusted by means of an adjusting nut 117. The tension of the spring 116 is sufficient to hold the plunger 111 in its innermost position until the pressure in the pipe 19 reaches a predetermined maximum.

The valve actuator 114 has its pressure end connected to the pipe 29 by a pipe 118, so that the inner end of the plunger 113 is subjected to the pressure which prevails in the upper end of the ram cylinder 7 when the machine is in operation, and its other end is open to the return pipe 33. Its plunger 113 is urged inward by a spring 119 whose tension may be adjusted by a nut 120, and the spring 119 has sufficient strength to hold the plunger 113 in its innermost position until the pressure in the pipe 29 reaches a predetermined maximum.

An increase in the resistance to the rotary movement of the spindle 10 increases the torque of the motor 15 and, as the pump 20 is driving the motor 15 through a solid column of liquid in pipe 19, the hydraulic pressure in the pipes 19 and 115 and in the inner end of the valve actuator 112 increases in proportion to the increase in resistance. When the pressure in the valve actuator 112 becomes sufficient to overcome the spring 116, the plunger 111 moves outward, engages the abutment 110 and moves the plunger 107 of the valve 102 to the position shown in Fig. 11.

Figure 11:
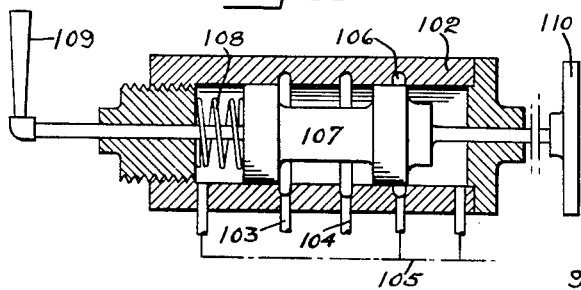
Fig. 11 is a longitudinal section through a valve for retracting the spindle upon a predetermined increase in tool resistance.

Similarly, an increase in the resistance to the downward movement of the spindle 10 causes a corresponding increase in hydraulic pressure in the upper end of the cylinder 7, the pipes 44, 29 and 118, and in the rear end of the valve actuator 114 and, when the pressure in the valve actuator 114 becomes sufficient to overcome the resistance of the spring 119, the plunger 107 of the valve 102 is moved to the position shown in Fig. 11.

When the plunger 107 is in this position, the lower end of the latch cylinder 78 is open to the pump 83 through the pipe 104, the valve 102 and the pipe 103, and the liquid supplied by the pump 83 raises the plunger 77 and disengages the latch 75 from the stop 70.

The spring 63 now swings the operating lever 57 into alinement with the lever 61, as shown in dotted lines in Fig. 14, and a pin 121 on the lever 57 abuts the upper end of the latch 66 and disengages it from the lever 61.

The latch 76 is initially held in its upper position, as shown in Fig. 14, by liquid supplied to the cylinder 81 from the pump 83 through the pipe 103, a pipe 122, a limit valve 123 and a pipe 124.

Figure 8:
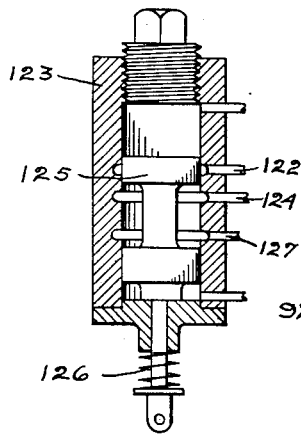
Fig. 8 is a longtiudinal section through a valve for limiting the upward movement of the spindle.

The plunger 125 of the limit valve 123 is moved downward to the position shown in Fig. 8 by a helical compression spring 126 as soon as the ram 8 has moved downward a short distance, thus opening the lower end of the latch cylinder 81 to the return pipe 33 through the pipe 124, the valve 123, a pipe 127 and the pipe 87 so that the spring 82 may expel the liquid from the lower end of the cylinder 81 and move the latch 76 into the path of the stop 70.

The plunger 80 is forced into the cylinder 81 by the stop 70 engaging the beveled edge of the latch 76 and then the spring 82 forces the plunger 80 outward to move the latch 76 behind the stop 70 and hold it in the position shown in dotted lines in Fig. 14.

The movement of the lever 57 operates the valve 24 which causes the pump 23 to deliver liquid at its full capacity through the valve 24 and the pipe 54 into the pipe 53. As the check valve 52 prevents the liquid from passing into the pipe 51, the same is directed into the front end of the cylinder 26 and moves the valve plunger 56 rearward to close the port 28, uncover the port 55, and swing the lever 61 against the action of the spring 63 into the position initially occupied by the lever 57, as shown in dotted lines in Fig. 14. The lever 61 is then held in that position by a catch 128 which is pivoted upon a stationary pin 129 and engages the upper end of the lever 61 as the same arrives in that position.

From the valve cylinder 26, the liquid passes through the port 55, the pipe 50, the check valve 48 and the pipe 46 into the bottom of the cylinder 7 and moves the ram 8 upward at a rapid rate. The liquid in the top of the cylinder 7 is returned to the pump 23 through the pipe 44, the valve cylinder 30, the pipe 29, a pipe 130 which is connected to the pipe 29 intermediate its ends, a check valve 131, a pipe 132, the pipe 25 and the valve 24.

If the ram 8 was retracted due to excessive resistance to its downward movement, the high pressure in the pipes 29 and 118 and in the valve actuator 114 is relieved as soon as the output of the pump 23 is reversed and, if the ram was retracted due to an increase in the torque of the driving motor 15, the high pressure in the pipes 19 and 115 and in the valve actuator 112 is relieved as soon as the drill 12 has been retracted a short distance.

In either case, the spring 108 moves the valve plunger 107 of the valve 102 into its initial position and thereby connects the latch cylinder 78 to the return pipe 33 through the pipe 104, the valve 102 and the pipe 105 so that the spring 79 is enabled to expel the liquid from the cylinder 78 and move the latch 75 into the path of the stop 70.

When the ram 8 and the post 93 move upward, the pressure exerted by the stop 101 upon the arm 98 of the gripping lever 94 is released and the spring 97 causes the arm 96 to engage the post 93 with sufficient force to move the actuator 92 upward with the post 93 and out of engagement with the abutment 91 to enable the spring 90 to return the valve plunger 89 to its initial position.

The lower part of latch cylinder 73 is then open to the return pipe 33 through the pipe 86, the valve 84, the port 88 and the pipe 87 so that the spring 74 is able to move the latch plunger 72 outward to expel the liquid in the lower part of the cylinder 73 and move the latch 71 into the path of the stop 70.

Each time that the drill binds, it may be either retracted a predetermined distance or retracted to a predetermined point, then readvanced at high speed until just before the drill again engages the work, and then fed into the work at the predetermined feeding rate.

After the drill has been retracted a predetermined distance or to a predetermined point, the plunger 125 of the limit valve 123 is returned automatically to its initial position and liquid from the pump 83 is supplied to the latch cylinder 81 to raise the latch 76 and release the stop 70.

The spring 63 then swings the operating lever 61 to its initial position and the latch 71 secures it in that position. The movement of the operating lever 57 operates the valve 24 to cause the pump 23 to deliver liquid at its full capacity to the upper end of the cylinder 7 through the valves 27 and 31, as previously described, and the pressure liquid in the valve 27 forces its plunger 56 outward to move the lever 61 to its initial position where it is again secured by the catch 66.

When the drill 12 arrives at substantially the point from which it was retracted, that is, when it is about to reengage the work 13, the actuator 92 engages the abutment 91 to operate the valve 84 and thereby cause the drill to continue its advance at the predetermined feeding rate, and then the downward movement of the actuator 92 is arrested by the stop 101 as previously described.

The limit valve 123 is operated by a valve operating mechanism 133 which is carried by the frame 3 and which is shown in detail in Figs. 5, 6 and 7.

The valve operating mechanism 133 has a slide 134 arranged for vertical reciprocation in a guide 135 carried by the frame 3, and the slide 134 is connected by a rod 136 to the plunger 125 of the valve 123.

The slide 134 carries a cross slide 137 which has a supporting bar 138 slidably arranged in a double bearing 139 carried by the main slide 134, and the cross slide 137 is held against rotation in the bearing 139 by a rod 140 which extends through a slot 141 in a flange 142 on the main slide 134 and is connected at its upper end to the bar 138 and at its lower end to an abutment 143 formed on the lower end of the cross slide 137.

The supporting bar 138 has a head or abutment 144 arranged upon one of its ends and a helical compression spring 145 encircles that end of the bar 138 between the head 144 and the end of the bearing 139 to urge the cross slide 137 transversely of the main slide 134. The other end of the bar 138 has a clevis 146 secured thereon which is adapted to abut the other end of the bearing 139 and limit the movement of the cross slide 137 under the action of the spring 145.

The cross slide 137 is adapted to be moved in the opposite direction against the action of the spring 145 by a link 147 having one of its ends connected to the clevis 146 and its other end connected to the long arm of a bell crank lever 148 which is pivoted upon a bracket 149 carried by the frame 3.

The lever 148 is actuated, to move the cross slide 137 against the action of the spring 145, by an arm 150 which is carried by a stop collar 151 and engages the short arm of the lever 148 just before the drill 12 reaches the limit of its downward movement.

The stop collar 151 is secured in an adjusted position upon the ram 8 at a distance above the top of the cylinder 7 which is equal to the distance that the drill 12 is to be advanced. Thus, when the drill 12 has penetrated the work 13 to the desired depth, the arm 150 operates the bell crank lever 148 and the collar 151 abuts the top of the cylinder 7 to prevent further downward movement of the ram 8 and thereby cause the ram 8 to be retracted due to increased hydraulic pressure in the upper end of the cylinder 7, as previously described.

When the cross slide 137 of the valve operating mechanism 133 is moved transversely of the main slide 134 by the lever 148, it is temporarily latched in that position by a latch plunger 152 which is carried by the main slide 134 and urged upward between the clevis 146 and the end of the bearing 139 by a helical compression spring 153.

The plunger 152 remains between the clevis 146 and the bearing 139 to hold the cross slide 137 out of its normal position only while the ram 8 is moving from its lowermost to its uppermost position and it is employed to hold the cross slide 137 out of alinement with an actuator 154 which is arranged upon a post 155 carried by the support 39.

The actuator 154 has a lug 156 upon its upper end, to engage the abutment 143 on the cross slide 137 and thereby actuate the valve operating mechanism 133, and is also provided with a gripping arm 157 which is pivoted intermediate its ends upon a pin 158 and has its lower end urged against the post 155 by a helical compression spring 159 which is arranged between its upper end and the body of the actuator.

As the ram 8 arrives at its uppermost position, an actuator 160 on the upper end of the post 93 engages an abutment 161 on the upper end of the cross slide 137 and raises the slide 134, thus raising the valve plunger 125 to its initial position and raising the clevis 146 above the end of the latch plunger 152.

When the clevis 146 is raised above the plunger 152, the spring 145 moves the cross slide 137 until it engages the side of the lug 156 on the actuator 154, as shown in Figs. 3 and 14.

When the valve plunger 125 is moved to its initial position, the liquid delivered by the pump 23 is directed into the pipe 29 to move the ram 8 downward, as previously described, but the support 39 engages the collar 38 on the rod 37 and raises the plunger 32 of the valve 31 at the same time that the valve plunger 125 is raised so that the output of the pump 23 is directed into the return pipe 33 and the ram 8 remains stationary.

In adjusting the press to operate upon a piece of work, the handle 42 is drawn outwardly to move the valve plunger 32 downward and the drill 12 is allowed to descend until it is about to engage the work 13.

The valve plunger 32 is then returned to its initial position to arrest the downward movement of the drill 12 by means of a hand lever 162 which is pivoted at its inner end upon the frame 3 and pivoted intermediate its ends to the valve stem 36.

The actuator 92 is then moved against the abutment 91 to hold the valve plunger 89 in its lower position and, if more than one piece of work of the same kind is to be drilled, the collar 100 is moved against the bottom of the actuator 92 and clamped to the post 93.

As the ram 8 moves downward, the lug 156 on the actuator 154 rides along the side of the cross slide 137 until it passes beyond the lower end thereof and then the spring 145 moves the cross slide 137 transversely of the main slide 134 until the clevis 146 abuts the end of the bearing 139, thus moving the abutment 143 into alinement with the lug 156 on the actuator 154.

If the drill 12 is to be retracted to a predetermined point each time that the tool resistance reaches a predetermined maximum, the actuator 154 is so positioned upon the post 155 that its lug 156 will engage the abutment 143 and raise the slide 134 when the drill has been retracted to the predetermined point, for instance the top of the work 13.

The lever 162 may then be moved downward to operate the valve 31 and cause the drill 12 to be fed into the work.

As the actuator 154 is held in position upon the post 155 by its gripping arm 157, it will descend with the ram 8 and, when the drill is retracted due to tool resistance, it will rise with the ram 8 until its lug 156 engages the abutment 143 to operate the valve 123 and thereby cause the ram 8 to be readvanced at high speed.

As the actuator 92 is held stationary by the stop 101 after the drill engages the work and as it grips the post 93 as soon as the ram 8 starts to rise, it will be raised the same distance as the actuator 154. Consequently, the drill will be readvanced at high speed until it is about to reengage the work and then the actuator 92 will operate the valve 84 to cause the drill to continue its advance at the feeding rate.

If the drill 12 is to be retracted a predetermined distance each time that the tool resistance reaches a predetermined maximum, the downward movement of the actuator 154 is limited by an adjustable stop 163 which is pivoted upon a post 164 carried by an arm 165 of the frame 3. The stop 163 is held against downward movement by a stop collar 166 which is secured to the post 164 in adjusted positions, as by means of a set screw.

The actuator 154 is adjusted upon the post 155 at a distance below the valve operating mechanism 133 which is equal to the distance that the drill is to be retracted, the stop 163 is adjusted upon the post 164 to hold the actuator 154 against downward movement, and then the collar 166 is secured to the post 164 to support the stop 163 in that position.

When the ram advances, the post 155 will move downward through the actuator 154 which is held stationary by the stop 163. Then, when the ram is retracted, the actuator 154 rises but a short distance to actuate the valve operating mechanism 133 to readvance the ram and this distance always remains the same.

The drill 12 is thus retracted a predetermined distance or to a predetermined point each time that it meets a predetermined resistance and it is alternately retracted and advanced as often as it meets that resistance until it completes its operation, at which time, the collar 151 on the ram 8 engages the top of the cylinder 7 and arrests further downward movement of the drill 12, the arm 150 operates the lever 148 to move the cross slide 137 out of its alinement with the actuator 154, the latch plunger 152 holds the cross slide in position, the pressure created by the collar 151 engaging the top of the cylinder 7 causes the ram 8 to be retracted, the actuator 154 moves upward with the post 155 past the side of the cross slide 137 and, as the ram 8 arrives at its uppermost position, the actuator 160 raises the slide 134 to operate the valve 125 and release the plunger 152 from the cross slide 137 which is retracted by spring 145 until it abuts the side of the lug 156 on actuator 154, the operation of the valve 125 causes the delivery of the pump 123 to be reversed, and the support 39 engages the collar 38 on the rod 37 to move the valve plunger 32 to its initial position and thereby interrupt the delivery of liquid from the pump 23 to the ram cylinder 7 so that the ram 8 remains stationary.

If another piece of work of the same kind is to be drilled, it is secured in position upon the machine, the actuator 92 is moved downward against the collar 100, the actuator 154 is moved downward against the stop 163, and the handle 42 is operated to start the machine.

The invention herein set forth is susceptible of various modifications and adaptations without departing from the scope thereof as hereafter claimed.

The invention is hereby claimed as follows:

1. A machine, comprising a tool carrying member and a work carrying member having relative rotary and axial movements, a tool carried by one of said members, a hydraulic drive for rotating one of said members, a hydraulic motor for moving one of said members from a stationary position toward and from the other member independently of said drive, hydraulic means responsive to the resistance to the forward movement of said movable member for reversing said motor substantially instantly upon said resistance reaching a predetermined maximum to cause said motor to retract said movable member, and hydraulic means for automatically reversing said motor to readvance said movable member upon said movable member reaching a predetermined point short of its stationary position.

2. A machine, comprising a head, another head movable axially toward and from said first mentioned head, a tool carried by one of said heads, a drive for rotating one of said heads, a hydraulic motor for advancing said movable head toward the other head, hydraulically actuated means responsive to tool resistance for reversing said motor to retract said movable head each time tool resistance reaches a predetermined maximum, hydraulically actuated means for reversing said motor before said movable head is fully retracted and causing said motor to readvance said movable head at high speed to substantially the point from which the same was retracted, and hydraulic means for then reducing the speed of said motor to cause said movable head to continue its advance at a relatively slow speed.

3. A drilling machine, comprising a frame, a spindle arranged in said frame, a tool carried by said spindle, a hydraulic driving motor for rotating said spindle, a hydraulic feed motor for advancing and retracting said spindle, valve means for controlling said feed motor to advance said spindle at a predetermined cutting speed and to advance or retract the same at a relatively high speed, hydraulically actuated means responsive to tool resistance for operating said valve means to cause said spindle to be retracted a predetermined adjustable distance each time said resistance reaches a predetermined maximum, and hydraulic means for operating said valve means to cause said spindle to be readvanced after the same has been retracted.

4. A drilling machine, comprising a frame, a spindle arranged in said frame, a tool carried by said spindle, a hydraulic driving motor for rotating said spindle, a hydraulic feed motor for advancing and retracting said spindle, valve means for controlling said feed motor to advance said spindle at a predetermined cutting speed and to advance or retract the same at a relatively high speed, hydraulically actuated means responsive to tool resistance for operating said valve means to cause said spindle to be retracted to a predetermined adjustable point each time said resistance reaches a predetermined maximum, and hydraulic means for operating said valve means to cause said spindle to be readvanced after the same has been retracted.

5. A drilling machine, comprising a frame, a spindle arranged in said frame, a tool carried by said spindle, a hydraulic driving motor for rotating said spindle, a hydraulic feed motor for advancing and retracting said spindle, valve means for controlling said feed motor to advance said spindle at a predetermined cutting speed and to advance or retract the same at a relatively high speed, hydraulically actuated means responsive to tool resistance for operating said valve means to cause said spindle to be retracted at high speed a predetermined distance each time said resistance reaches a predetermined maximum, hydraulic means for operating said valve means to cause said spindle to be readvanced at high speed to substantially the point from which same was retracted, and hydraulic means for causing said spindle to then advance at said cutting speed.

6. A drilling machine, comprising a frame, a spindle arranged in said frame, a tool carried by said spindle, a hydraulic driving motor for rotating said spindle, a hydraulic feed motor for advancing and retracting said spindle, valve means for controlling said feed motor to advance said spindle at a predetermined cutting speed and to advance or retract the same at a relatively high speed, hydraulically actuated means responsive to tool resistance for operating said valve means to cause said spindle to be retracted at high speed to a predetermined point each time said resistance reaches a predetermined maximum, hydraulic means for operating said valve means to cause said spindle to be readvanced at high speed to substantially the point from which same was retracted, and hydraulic means for causing said spindle to then advance at said cutting speed.

7. A drilling machine, comprising a frame, a cylinder carried by said frame, a ram arranged in said cylinder, a spindle carried by said ram, a hydraulic motor for rotating said spindle, means for delivering liquid to said motor and said cylinder including a valve for directing liquid first to one end of said cylinder to advance said ram and then to the other end thereof to retract said ram, mechanism connected to said valve for operating the same, hydraulically actuated means responsive to a predetermined increase in hydraulic pressure for actuating said valve operating mechanism to cause said ram to be retracted, and other means for operating said valve actuating means automatically to readvance said ram before said ram is fully retracted.

8. A drilling machine, comprising a frame, a cylinder carried by said frame, a ram arranged in said cylinder, a spindle carried by said ram, hydraulic means for rotating said spindle, a pump for delivering liquid to said cylinder and having a valve for directing liquid first to one end of said cylinder to advance said ram and then to the other end thereof to retract said ram, mechanism connected to said valve for operating the same, hydraulically actuated means responsive to a predetermined increase in hydraulic pressure for actuating said valve operating mechanism to cause said ram to be retracted, and valve means operable by the movement of said ram for directing liquid to said valve operating mechanism to actuate the same and thereby cause said ram to be readvanced after it has been retracted.

9. A drilling machine, comprising a frame, a cylinder carried by said frame, a ram arranged in said cylinder, a spindle carried by said ram, hydraulic means for rotating said spindle, a pump for delivering liquid to said cylinder and having a valve for directing liquid first to one end of said cylinder to advance said ram and then to the other end thereof to retract said ram, mechanism connected to said valve for operating the same, hydraulically actuated means responsive to a predetermined increase in hydraulic pressure for actuating said valve operating mechanism to cause said ram to be retracted, and valve means operable by the movement of said ram for directing liquid to said valve operating mechanism to actuate the same and thereby cause said ram to be readvanced after it has been retracted a predetermined distance.

10. A drilling machine, comprising a frame, a cylinder carried by said frame, a ram arranged in said cylinder, a spindle carried by said ram, hydraulic means for rotating said spindle, a pump for delivering liquid to said cylinder and having a valve for directing liquid first to one end of said cylinder to advance said ram and then to the other end thereof to retract said ram, mechanism connected to said valve for operating the same, and hydraulically actuated means responsive to a predetermined increase in hydraulic pressure for actuating said valve operating mechanism to cause said ram to be retracted and valve means operable by the movement of said ram for directing liquid to said valve operating mechanism to actuate the same and thereby cause said ram to be readvanced after it has been retracted to a predetermined point.

11. A drilling machine, comprising a frame, a cylinder carried by said frame, a ram arranged in said cylinder, a spindle carried by said ram, hydraulic means for rotating said spindle, a pump for delivering liquid to said cylinder and having a valve for directing liquid first to one end of said cylinder to advance said ram and then to the other end thereof to retract said ram, mechanism connected to said valve for operating the same, hydraulically actuated means responsive to a predetermined increase in hydraulic pressure for actuating said valve operating mechanism to cause said ram to be retracted, a limit valve for directing liquid to said valve operating mechanism to actuate the same and thereby cause said ram to be readvanced after it has been retracted, a post carried by said ram and movable therewith, and an actuator arranged upon said post and frictionally held thereon for operating said limit valve after said ram has been retracted to a predetermined point.

12. A drilling machine, comprising a frame, a cylinder carried by said frame, a ram arranged in said cylinder, a spindle carried by said ram, hydraulic means for rotating said spindle, a pump for delivering liquid to said cylinder and having a valve for directing liquid first to one end of said cylinder to advance said ram and then to the other end thereof to retract said ram, mechanism connected to said valve for operating the same, hydraulically actuated means responsive to a predetermined increase in hydraulic pressure for actuating said valve operating mechanism to cause said ram to be retracted, a limit valve for directing liquid to said valve operating mechanism to actuate the same and thereby cause said ram to be readvanced after it has been retracted, a post carried by said ram and movable therewith, an actuator arranged upon said post and frictionally held thereon for operating said limit valve, and an adjustable stop carried by said frame to limit the movement of said actuator during the advance of said ram whereby said ram will be readvanced after it has been retracted a predetermined distance.

13. The combination with a hydraulically controlled drill press having means for retracting its spindle upon a predetermined increase in tool resistance and a limit valve for readvancing said spindle automatically after it has been retracted, of valve operating mechanism connected to said valve, a post movable with said spindle, an actuator arranged upon said post for actuating said valve operating mechanism to cause said spindle to be retracted, and means for automatically moving said valve operating mechanism out of alinement with said actuator in response to said spindle approaching the limit of its advance to prevent said actuator from operating said mechanism during the next retraction of said spindle.

14. A machine tool, comprising a spindle, a tool carried by said spindle, a drive for rotating said spindle, a motor for reciprocating said spindle independently of said drive, hydraulic means for controlling said motor to cause it to advance said spindle at high speed and move said tool toward the work, hydraulic means for decelerating said motor before said tool engages the work to thereby advance said tool into the work at slow speed, hydraulic means responsive to the resistance to the movement of said spindle for controlling said motor to cause it to retract said spindle each time said resistance reaches a predetermined maximum, means for limiting the retraction of said spindle and causing it to be readvanced each time it is retracted, means for limiting the ultimate advance of said spindle and causing it to be retracted, means operable upon said spindle reaching the limit of its advance for rendering said retraction limiting means inoperative to thereby permit said spindle to be fully retracted, and means for preventing said motor from automatically readvancing said spindle after it has been fully retracted.

15. A machine, comprising a head, another head movable axially toward and from said first mentioned head, a tool carried by one of said heads, a drive for rotating one of said heads, a hydraulic motor for advancing said movable head from a fully retracted position toward the other head independently of said drive, hydraulically actuated means responsive to tool resistance for reversing said motor to retract said movable head, and hydraulically actuated means for automatically reversing said motor to readvance said movable head upon said head reaching a predetermined point short of said fully retracted position.

16. A machine for drilling or boring deep holes, comprising a frame, a spindle arranged in said frame, a drill carried by said spindle, a drive for rotating said spindle, a hydraulic feed for advancing said spindle independently of said drive, hydraulically actuated means responsive to tool resistance for reversing said feed each time resistance reaches a predetermined maximum to cause said spindle to be retracted, and hydraulic means responsive to said spindle being retracted and operable before said spindle is fully retracted for automatically reversing said feed to readvance said spindle.

17. A machine for drilling or boring deep holes comprising a frame, a spindle arranged in said frame, a drive for rotating said spindle, a feed for advancing said spindle independently of said drive, hydraulically actuated means responsive to the torque of said spindle for reversing said feed to cause said spindle to be retracted, and hydraulic means responsive to said spindle being retracted and operable before said spindle is fully retracted for automatically reversing said feed to readvance said spindle.

18. A machine for drilling or boring deep holes, comprising a frame, a spindle arranged in said frame, means for rotating said spindle, a hydraulic feed for advancing said spindle independent of the rotation thereof, hydraulically actuated means responsive to tool resistance for reversing said feed to cause said spindle to be retracted, hydraulic means responsive to said spindle being retracted and operable before said spindle is fully retracted for automatically reversing said feed to readvance said spindle, and manual means for arresting the advance of said spindle.

19. A machine for drilling or boring deep holes, comprising a frame, a spindle arranged in said frame, a drive for rotating said spindle, a hydraulic feed for advancing said spindle independent of the rotation thereof, hydraulically actuated means responsive to tool resistance for reversing said feed to cause said spindle to be retracted, hydraulic means responsive to said spindle being retracted and operable before said spindle is fully retracted for automatically reversing said feed to readvance said spindle, and manual means for controlling the movement of said spindle independently of the aforesaid means.

GLEN MACOMBER.